(12) United States Patent
Milliron et al.

(10) Patent No.: US 9,207,513 B2
(45) Date of Patent: Dec. 8, 2015

(54) NANOCRYSTAL-POLYMER NANOCOMPOSITE ELECTROCHROMIC DEVICE

(71) Applicant: THE REGENTS OF THE UNIVERSITY OF CALIFORNIA, Oakland, CA (US)

(72) Inventors: Delia Milliron, Oakland, CA (US); Evan Runnerstrom, Oakland, CA (US); Brett Helms, San Francisco, CA (US); Anna Llordes, Berkeley, CA (US); Raffaella Buonsanti, Oakland, CA (US); Guillermo Garcia, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 14/391,366

(22) PCT Filed: Mar. 15, 2013

(86) PCT No.: PCT/US2013/032495
§ 371 (c)(1),
(2) Date: Oct. 8, 2014

(87) PCT Pub. No.: WO2013/154779
PCT Pub. Date: Oct. 17, 2013

(65) Prior Publication Data
US 2015/0062687 A1     Mar. 5, 2015

Related U.S. Application Data

(60) Provisional application No. 61/734,284, filed on Dec. 6, 2012, provisional application No. 61/622,203, filed on Apr. 10, 2012, provisional application No. 61/623,295, filed on Apr. 12, 2012.

(51) Int. Cl.
G02F 1/153     (2006.01)
G02F 1/15      (2006.01)
(Continued)

(52) U.S. Cl.
CPC ............... G02F 1/15 (2013.01); G02F 1/0018 (2013.01); G02F 1/155 (2013.01); G02F 1/1508 (2013.01);
(Continued)

(58) Field of Classification Search
CPC ......... G02F 1/163; G02F 1/155; G02F 1/153; E06B 2009/2464; E06B 9/24
USPC ................................................... 359/265–280
See application file for complete search history.

(56) References Cited

U.S. PATENT DOCUMENTS 4,993,810 A     2/1991  Demiryont
6,055,088 A  *  4/2000  Fix ........................ B32B 17/10
                                                        359/265

(Continued)

OTHER PUBLICATIONS

International Search Report and Written Opinion of PCT Application No. PCT/US2013/032495, filed Mar. 15, 2013, 14 pages.
(Continued)

Primary Examiner — Mohammed Hasan
(74) Attorney, Agent, or Firm — Lowenstein Sandler LLP (57) ABSTRACT

Described is an electrochromic nanocomposite film comprising a solid matrix of an oxide based material, the solid matrix comprising a plurality of transparent conducting oxide (TCO) nanostructures dispersed in the solid matrix and a lithium salt dispersed in the solid matrix. Also described is a near infrared nanostructured electrochromic device having a functional layer comprising the electrochromic nanocomposite film.

17 Claims, 9 Drawing Sheets

(51) Int. Cl.
*G02F 1/00* (2006.01)
*G02F 1/155* (2006.01)

(52) U.S. Cl.
CPC . *G02F 2001/1515* (2013.01); *G02F 2001/1519* (2013.01); *G02F 2001/1555* (2013.01); *G02F 2202/36* (2013.01)

(56) References Cited

U.S. PATENT DOCUMENTS

| | | | |
|---|---|---|---|
| 6,124,261 | A | 9/2000 | Stevenson et al. |
| 6,203,154 | B1 | 3/2001 | Kobayashi et al. |
| 7,722,966 | B1 * | 5/2010 | Lee .......................... C23C 14/08 204/192.1 |
| 2004/0056239 | A1 | 3/2004 | Fitzmaurice et al. |
| 2004/0131934 | A1 | 7/2004 | Sugnaux et al. |
| 2005/0104136 | A1 | 5/2005 | Edwards et al. |
| 2005/0231785 | A1 | 10/2005 | Oh et al. |
| 2008/0209876 | A1 | 9/2008 | Miller |
| 2009/0233090 | A1 | 9/2009 | Wong et al. |
| 2010/0307792 | A1 | 12/2010 | Allemand et al. |
| 2011/0006269 | A1 | 1/2011 | Petruska et al. |
| 2011/0071316 | A1 | 3/2011 | Millward et al. |
| 2011/0151283 | A1 | 6/2011 | Gillaspie et al. |
| 2012/0033287 | A1 | 2/2012 | Friedman et al. |
| 2012/0041121 | A1 | 2/2012 | Asakawa et al. |

OTHER PUBLICATIONS

Bruce, P.G. (1996). "Coordination Chemistry in the Solid State" Philosophical Transactions of The Royal Society. 354:415-436.

Buonsanti, R. et al. (2011). "Tunable Infrared Absorption and Visible Transparency of Colloidal Aluminum-Doped Zinc Oxide Nanocrystals" Nano Letters. 11:4706-4710.

Choi, S-I. et al. (2008). "Preparation and Optical Properties of Colloidal Monodisperse, and Highly Crystalline ITO Nanoparticles" American Chemical Society. 20(8):2609-2611.

Delongchamp, D.M. et al. (2004). "Multiple-Color Electrochromism from Layer-by-Layer-Polyaniline/Prussian Blue Nanocomposite Thin Films" American Chemical Society. 16:4799-4805.

Dong, A. et al. (2011). "A Generalized Ligand-Exchange Strategy Enabling Sequential Surface Functionalization of Colloidal Nanocrystals" American Chemical Society. 133:998-1006.

Fergus, J.W. (2010). "Ceramic and Polymeric Solid electrolytes for Lithium-ion Batteries" Journal of Power Sources. 195:4554-4569.

Garcia, G. et al. (2011). "Dynamically Modulating the Surface Plasmon Resonance of Doped Semiconductor Nanocrystals" Nano Letters 11:4415-4420.

Gilstrap Jr., R.A. et al. (2008). "Synthesis of a Nonagglomerated Indium Tin Oxide Nanoparticle Dispersion" Advanced Materials 20:4163-4166.

Llordes, A. et al. (2011). "Polyoxometalates and Colloidal Nanocrystals as Building Blocks for Metal Oxide Nanocomposite Films" Journal of Materials Chemistry 21:11631-11638.

Rosen, E.L. et al. (2012). "Exceptionally Mild Reactive Stripping of Native Ligands from Nanocyrstal Surfaces by Using Meerwein's Salt" Angewandte Communications 51:684-689.

Materials Research Society (2012). "Program—Symposium GG: Functional Inorganic Nanoparticle-Polymer Composites with Engineered Structures and Coupled Properties" 19 pages.

Lawrence Berkeley LAB Polymer-nanocrystal Composites for Electrochromic Devices, 1 page.

* cited by examiner

FIG. 8

NANOCRYSTAL-POLYMER NANOCOMPOSITE ELECTROCHROMIC DEVICE

RELATED APPLICATIONS

This application is a US National Stage 371 Application of PCT Application No.: PCT/US2013/032495, filed Mar. 15, 2013, which claims priority to U.S. Provisional Patent Application No. 61/734,284, filed Dec. 6, 2012, and U.S. Provisional Patent Application No. 61/622,203, filed Apr. 10, 2012, and U.S. Provisional Patent Application No. 61/623,295, filed Apr. 12, 2012 which are hereby incorporated by reference in their entirety.

STATEMENT OF GOVERNMENTAL SUPPORT

This invention was made with government support under Contract No. DE-AC02-05CH11231 awarded by the U.S. Department of Energy and through the Laboratory Directed Research and Development Program. The government has certain rights in the invention.

TECHNICAL FIELD

The present invention relates to the field of electrochromics, and more particularly to electrochromic nanocomposite materials and devices made there from.

BACKGROUND

Today, energy efficient windows are being used to help reduce the energy requirements for both heating and cooling of indoor spaces. Typical of such energy efficient windows are double pane windows separated by a spacer, the space filled with a thermally insulating gas such as air, argon, or xenon. These windows can be coated with static films for blocking near infrared (NIR) light, thus reducing the heat passing through the window. Other windows, tailored for use in colder climates, can be coated with films that block out far infrared light to help retain heat. One disadvantage of such coatings, however, is that they cannot be dynamically changed to accommodate changing weather conditions.

Electrochromic (EC) materials have been suggested for use with energy efficient windows, these coatings able to reversibly switch their optical properties when a voltage is applied. Presently, tungsten oxide ($WO_3$) is the most studied electrochromic coating for commercially available windows. Nevertheless, when $WO_3$ switches, it modulates mainly the visible part of the light spectrum (540-750 nm), while the near infrared (NIR) light spectrum (750-2500 nm) remains either unchanged or switches simultaneously with the visible.

As another drawback, previous TCO nanocrystal-based electrochromic devices have been implemented using a liquid electrolyte. Typical liquid electrolytes are volatile and can leak. As a result, a liquid electrolyte is not suitable for a large scale commercial device.

DETAILED DESCRIPTION

Described herein are embodiments of a solid electrochromic device having electrochromic properties in a near infrared (NIR) portion of the electromagnetic spectrum. The electrochromic device includes a nanocomposite film that exhibits the electrochromic properties. The nanocomposite film may be composed of networked transparent conducting oxide (TCO) nanostructures dispersed or embedded in a polymer matrix. In some embodiments, a lithium salt is dispersed in the polymer matrix, which enables the polymer matrix to conduct ionic charge, while the nanostructure network conducts electronic charge. The nanocomposite film may be one layer of a thin film stack that may include a transparent conductor, the nanocomposite film, a solid electrolyte/separator, a second optically passive or optically complementary nanocomposite film and a second transparent conductor. The electrochromic device may be activated, which causes the electrochromic device to block the transmission of NIR radiation. The electrochromic device may also be deactivated, which causes the electrochromic device to permit the transmission of NIR radiation.

Also described herein are embodiments of manufacturing a solid electrochromic device and/or an electrochromic nanocomposite film for an electrochromic device having electrochromic properties in the NIR portion of the electromagnetic spectrum. The electrochromic film may be manufactured using solution processing techniques. In one embodiment, to manufacture an electrochromic nanocomposite film, transparent conducting oxide (TCO) nanostructures are created or provided. One example of TCO nanostructures are tin-doped indium oxide (ITO) nanocrystals. Ligands may then be stripped from surfaces of the TCO nanostructures in a solution. The TCO nanostructures may be precipitated out of the solution, and then dispersed into a second solution that includes a lithium ion-conducting polymer and a polar solvent. The second solution may also include a lithium salt and/or N,N-dimethyl formamide (DMF). This solution may then be deposited (e.g., spin cast) onto a substrate to form the electrochromic nanocomposite film. The deposited film may be composed of a polymer matrix of the lithium ion-conducting polymer, with the TCO nanostructures and/or lithium salt dispersed in the polymer matrix.

Some traditional electrochromic devices, and previous demonstrations of TCO nanocrystal-based electrochromic devices, use a liquid electrolyte to conduct lithium ions. However, use of a liquid electrolyte introduces numerous challenges in constructing a viable commercial electrochromic device. Such liquid electrolytes may cause leakage, corrosion, a short life span, and/or other difficulties. Use of a solid lithium ion-conducting polymer as an electrolyte for an electrochromic device, as described in embodiments herein, addresses many of the challenges caused by liquid electrolytes. The electrochromic device may be a thin film stack that can be used to coat a window or other substrate to control the transmission of NIR radiation through that substrate, while remaining passive to visible light. In a specific embodiment, the electrochromic nanocomposite film is a solid nanocomposite of Poly(ethylene oxide) (PEO) and tin-doped indium oxide (ITO) nanocrystals (NC) (referred to as a PEO-ITO NC nanocomposite). For such a nanocomposite film, a polymer matrix of the PEO carries ionic charge, while an active ITO NC filler network carries electronic charge and exhibit NIR electrochromism.

The electrochromic nanocomposite films and devices described herein may be manufactured using standard and inexpensive solution processing techniques at room temperature. These same techniques may also be used to manufacture other layers of the electrochromic device. These electrochromic nanocomposite films and devices incorporate materials that are inexpensive, easy to synthesize and process into devices, and environmentally friendly. In some embodiments, by using materials such as tin-doped indium oxide (ITO) nanocrystals, Poly(ethylene oxide), and a lithium salt such as lithium bis(trifluoromethylsulfonyl)imide (LiTFSI), the present system enables simple solution processibility and co-deposition of all three elements into a nanocomposite. With these materials, higher coloration efficiency, stronger infrared modulation, faster switching speed, and longer lifetime can be achieved as compared to traditional electrochromic films and devices.

These nanocomposites represent an important step towards realizing a fully solid-state, NIR selective, electrochromic device for dynamic smart windows. Future study of nanocrystal sizes and doping levels, nanocrystal morphologies, lithium content, polymer molecular weight, etc., will allow for a greater range of NIR modulation. Through the use of different nanocrystal fillers, active polymer-nanocrystal composites such as described herein may also be useful as solution-processible components in other electrochemical devices, such as batteries, supercapacitors, and dye-sensitized solar cells.

Some embodiments herein are described with reference to the use of nanocrystals (NCs). However, it should be understood that other nanostructures may also be used instead of or in addition to nanocrystals. For example, nanoparticles, nanorods, nanocones or nanowires may be used in some embodiments.

Figure 1:
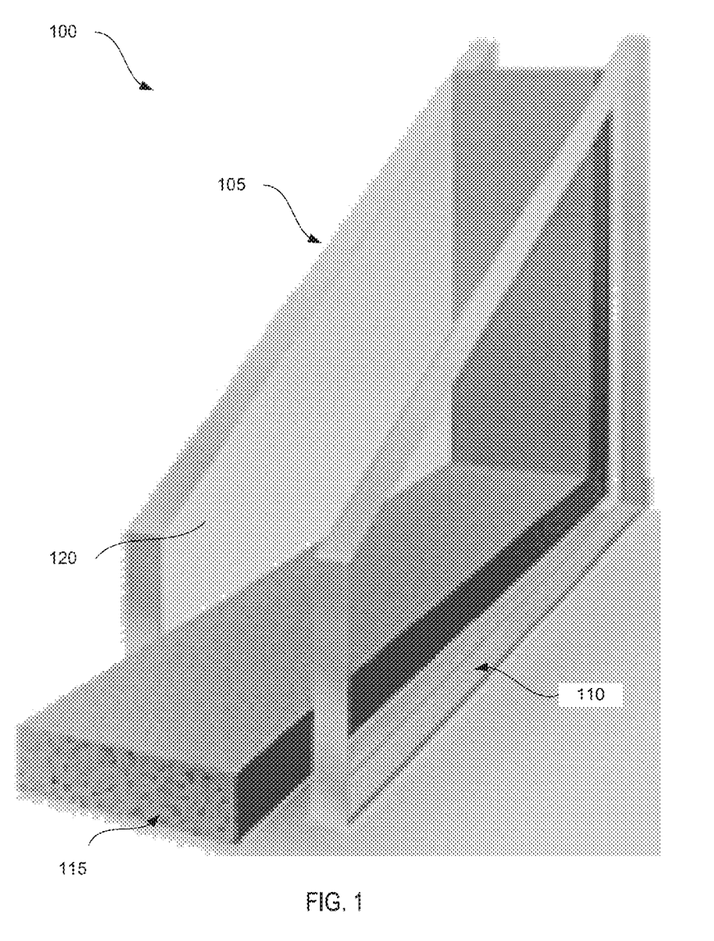
FIG. 1 is a sectioned illustration of a dual pane electrochromic window according to one implementation of the present invention.

Referring now to the figures, FIG. 1 is a sectioned illustration of a dual pane electrochromic window 100 according to one implementation of the present invention. The window 100 includes an outer pane 105 that typically faces an exterior environment (e.g., the outside of a building) and an inner pane 110 that typically faces in interior environment (e.g., the inside of a building) separated by a frame 115. The outer pane 105 and inner pane 110 may be glass, plastic, Poly(methyl methacrylate) (PMMA, also known as acrylic glass or Plexiglass@), Poly(ethylene terephthalate) (PET), quartz, silicon, ITO, or fluorine-doped tin oxide slides or another transparent substrate. A space separating the inner and outer panes 105, 110 may include a vacuum or an insulating gas such as air, argon or xenon.

In one implementation, an interior surface of the outer pane 105 is coated with a thin film electrochromic device 120. Additionally or alternatively, an exterior surface of the outer pane 105 and/or an interior or exterior surface of the inner pane 110 may be coated with the thin film electrochromic device 120. The thin film electrochromic device 120 may include transparent conductor films, an electrolyte, an electrochromic nanocomposite film that acts as an electrode and a counter electrode film. Embodiments of the thin film electrochromic device 120 are discussed in greater detail below with reference to FIGS. 2A-2B.

Figure 2A:
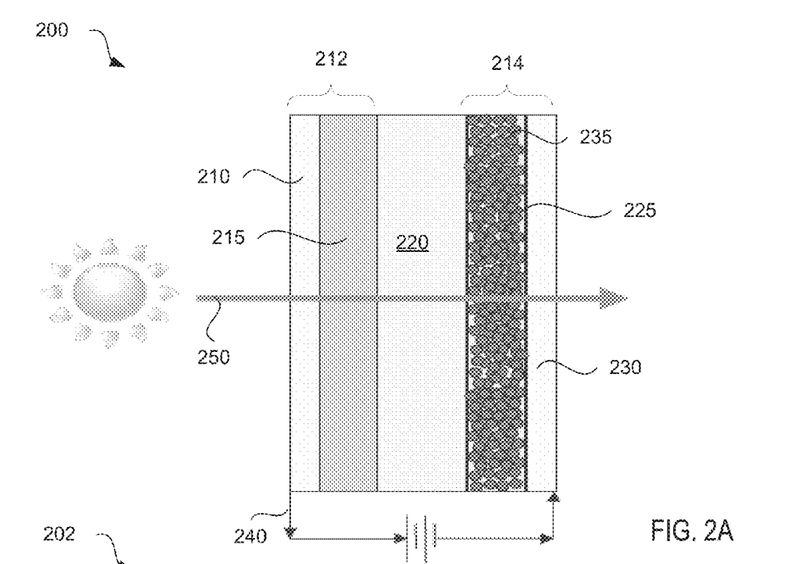
FIG. 2A illustrates a solid electrochromic device in an off state, according to one implementation of the present invention.
Figure 2B:
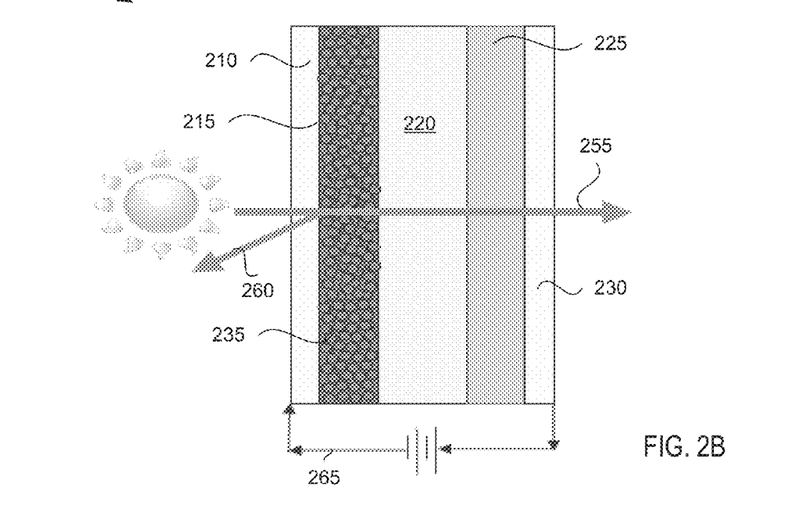
FIG. 2B illustrates a solid electrochromic device in an on state, according to one implementation of the present invention.

FIGS. 2A-2B illustrate a solid electrochromic device, according to one implementation of the present invention. FIG. 2A illustrates the solid electrochromic device in an off state 200, while FIG. 2B illustrates the solid electrochromic device in an on state 202. The illustrated electrochromic device is a thin film stack having five layers. However, the thin film stack may have more or fewer layers (e.g., three layers in one embodiment). The electrochromic device may be used to coat a substrate such as a window to provide selective transmission properties for NIR radiation.

A functional layer of the electrochromic device (layer that exhibits electrochromic properties for the electrochromic device) is an electrochromic nanocomposite film 215. The electrochromic nanocomposite film 215 may be a polymer-nanocrystal nanocomposite that includes a polymer matrix of a lithium ion-conducting polymer. Dispersed in the polymer matrix are a lithium salt and transparent conducting oxide (TCO) nanocrystals. In one embodiment, the lithium ion-conducting polymer may be Poly(ethylene oxide) (PEO). Other possible polymers include Poly(methyl methacrylate) (PMMA), poly(vinyl butyral) (PVB), cross-linked Poly(ethylene glycol) or a block copolymer such as PEO-block-poly (N,N-Dimethylacrylamide) (PEO-b-PDMA). Note that PMMA may exhibit insufficient conductance of lithium ions in a solid state, and PMMA molecules may be swollen by introducing a small amount of liquid to increase lithium conductance. This may cause the PMMA to have a gel state. In one embodiment, the TCO nanocrystals are ITO nanocrystals. Other possible TCO nanocrystals include aluminum doped zinc oxide (AZO) nanocrystals, indium-doped zinc oxide (IZO) nanocrystals, gallium-doped zinc oxide (GZO) nanocrystals, zinc, tin-doped indium oxide (ZITO) nanocrystals, fluorine-doped tin oxide (FTO) nanocrystals, or indium doped cadmium oxide (CdO:In) nanocrystals. A weight ratio of the TCO nanostructures to the lithium ion-conducting solid polymer is approximately 1:10 to approximately 2:1. A thickness of the electrochromic nanocomposite film 215 may be about 50-5000 nanometers in one embodiment. In a further embodiment, the thickness may be about 300-1000 nanometers.

The electrochromic nanocomposite film 215 may be coupled to a transparent conductive layer 210. The transparent conductive layer 210 may be a thin film that conducts electrons, and may provide an electrical path to the electrochromic nanocomposite film 215. The transparent conductive layer 210 may be, for example, a layer of graphene, carbon nanorods or metal nanowires. One example of a transparent conductive layer is an ITO film. When deposited as a thin film, the conductivity of an ITO layer commonly reaches 1000 S cm$^{-1}$ with greater than 80% optical transmittance in the visible region of the electromagnetic spectrum. The ITO film in one embodiment includes ITO nanocrystals having an average diameter of 10 nm or less. Other examples of a transparent conductor include an aluminum-doped zinc oxide (AZO) film, an indium-doped zinc oxide (IZO) film, a gallium-doped zinc oxide (GZO) film, an indium, gallium-doped zinc oxide (IGZO) film, a zinc, tin-doped indium oxide (ZITO) film, a fluorine-doped tin oxide (FTO) film, or a indium-doped cadmium oxide (CdO:In) film. Any of these films may be formed of nanocrystals and/or other nanostructures.

The electrochromic nanocomposite film 215 and the transparent conductive layer 210 together form an electrode 212 in one embodiment. For the electrochromic device to operate, the electrode 212 may be opposed by a counter electrode 214. The counter electrode 214 may include a second transparent conductive layer 230 coupled to an additional nanocomposite film 225. The second transparent conductive layer 230 may be formed of the same material or a different material from that of transparent conductive layer 210. The additional nanocomposite film 225 may be a lithium ion-conducting polymer having a solid polymer matrix with TCO nanocrystals and/or a lithium salt dispersed in the polymer matrix. The solid polymer matrix may be composed of PEO, PMMA, or any of the other polymers mentioned in association with the electrochromic nanocomposite film 215.

In contrast to the electrochromic nanocomposite film 215, the additional nanocomposite film 225 may not have electrochromic properties. Examples of such an additional nanocomposite film 225 include a nanocomposite film including TCO nanocrystals of cerium oxide, undoped indium oxide, or undoped zinc oxide. Alternatively, the nanocomposite film 225 may exhibit electrochromic modulation that is complementary to the electrochromic modulation of the electrochromic nanocomposite film 215. For example, the nanocomposite film 225 may be transparent when charged and colored uncharged. An example of such a complementary nanocomposite film is a nanocomposite film containing nanocrystals of or $Fe_7(CN)_{18}$ (commonly known as Prussian blue).

The electrode 212 and the counter electrode 214 may be separated by a solid electrolyte 220. In one embodiment, the solid electrolyte 220 is coupled to and separates the electrochromic nanocomposite film 215 and the additional nanocomposite film 225. The solid electrolyte 220 may be a lithium ion-conducting polymer having a solid polymer matrix with lithium ions dispersed in the polymer matrix. In one embodiment, the lithium ion-conducting polymer is PEO. Other polymers previously discussed may also be used for the electrolyte 220.

The polymer-nanocrystal nanocomposite of the electrochromic nanocomposite film 215 described in embodiments of this disclosure contains both active nanocrystal fillers (the TCO nanocrystals) and an active polymer matrix. This nanocomposite couples the ionic conductivity of the polymer with the electronic conductivity and plasmonic character of the nanocrystals, achieving electrochromic modulation and ionic conduction in the solid state. The networked nanocrystals conduct electronic charge and exhibit an electrochromic effect, while the polymer matrix, in addition to supporting and stabilizing the nanocrystals, acts as an electrolyte by conducting ionic charges that support the electrochromic effect. The nanocomposite may be fully solid and contain no liquid, but otherwise functions in a manner similar to traditional liquid TCO nanocrystal-based electrochromic devices.

While the electrochromic device is in the off state 200, electrode 212 is uncharged and ions 235 are trapped in the counter electrode 214 (e.g., in the additional nanocomposite film 225). As shown, electromagnetic radiation 250 is transmitted by the electrochromic device (e.g., passes through the all the layers of the electrochromic device) while it is in the off state 200. The electrochromic device may be switched to the on or active state by applying a reverse voltage 265 and charging the electrode 212. This causes the ions 235 to accumulate in the electrochromic nanocomposite film 215 of the electrode 212. As shown, radiation in the visible region of the electromagnetic spectrum (e.g., visible light) 255 is transmitted by the electrochromic device, while radiation in the NIR region of the electromagnetic spectrum is blocked by the electrochromic nanocomposite film 215 of the electrochromic nanocomposite device. The electrochromic device may be switched back to the off state by applying a voltage 240, which causes the lithium ions to migrate back to the counter electrode 214.

Figure 3A:
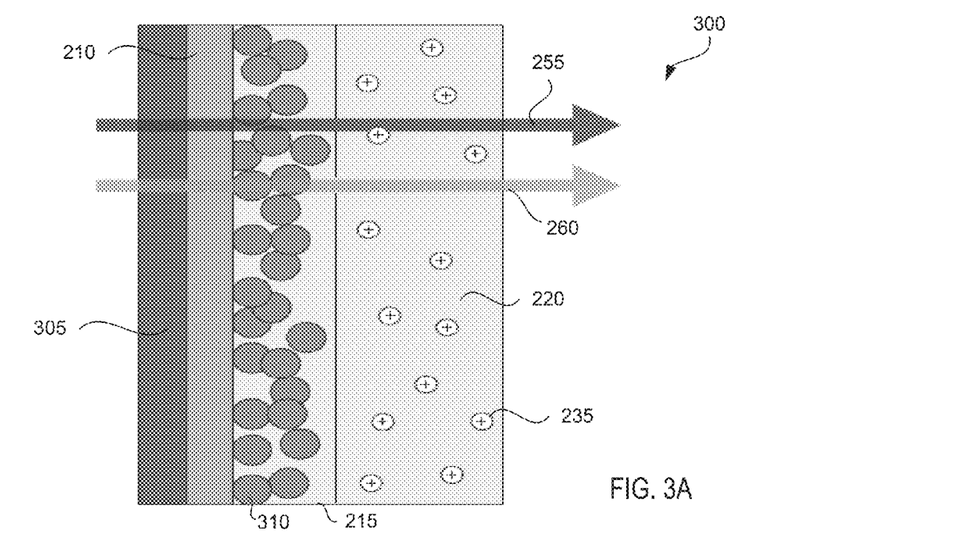
FIG. 3A illustrates a substrate with an electrochromic nanocomposite layer in an off state, according to one implementation of the present invention.
Figure 3B:
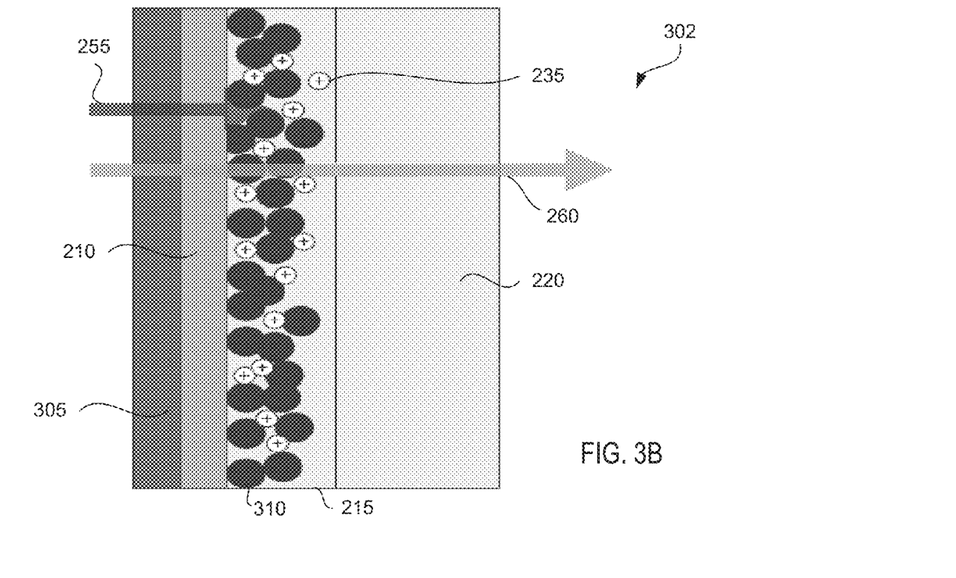
FIG. 3B illustrates a substrate with an electrochromic nanocomposite layer in an on state, according to one implementation of the present invention.

FIGS. 3A and 3B illustrate a portion of an electrochromic device, according to an embodiment of the present invention. FIG. 3A illustrates the portion of the electrochromic device in an off state 300. FIG. 3B illustrates the portion of the electrochromic device in an on state 302.

The illustrated portion of the electrochromic device includes a transparent conductive layer 210 coating a substrate 305. The substrate 305 may be a transparent substrate such as glass, plastic, and so forth. An electrochromic nanocomposite film 215 may coat the transparent conductive layer 210. Additionally, an electrolyte 220 may cover the electrochromic nanocomposite film 215. The electrochromic nanocomposite film 210 includes TCO nanocrystals 310 dispersed in a solid polymer matrix of a lithium ion-conducting polymer.

While the electrochromic device is in the off state 300, lithium ions 235 may be dispersed in the electrolyte 220 and/or in a counter electrode. In this state, both visible light 260 and NIR radiation 255 are transmitted by the electrochromic device. While the device is in the on state 302, the lithium ions 235 are attracted to the TCO nanocrystals 310 in the electrochromic nanocomposite film 215. As a result, the visible light 260 is still transmitted by the electrochromic device, but transmission of the NIR radiation is blocked at the electrochromic nanocomposite film 215.

Figure 4A:
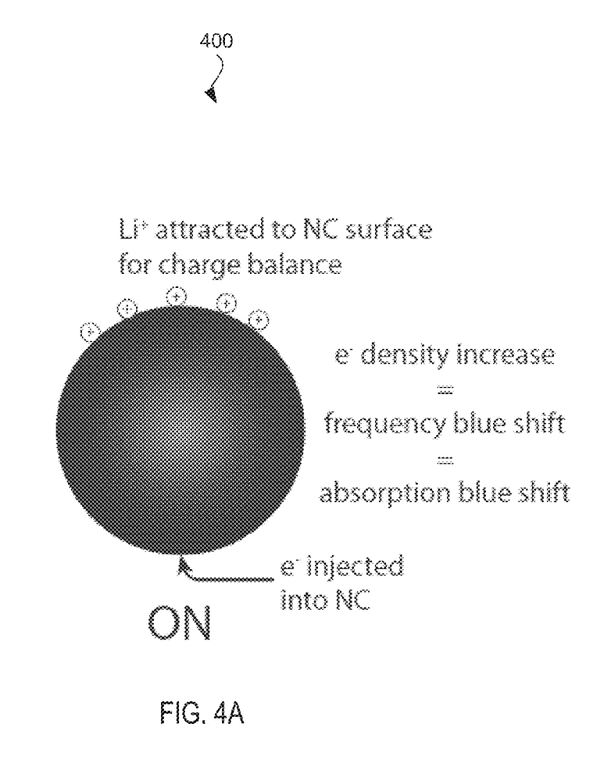
FIG. 4A is a schematic of nanocrystal electron density in a charged state, in accordance with an embodiment of the present invention.

FIG. 4A is a schematic of nanocrystal electron density in a charged (on) state, in accordance with an embodiment of the present invention. As shown, electrons are injected into a nanocrystal to place it into a charged (on) state, which causes lithium ions to be attracted to a surface of the nanocrystal. An increase in electron density of the nanocrystal causes the nanocrystal surface plasmon resonance frequency to be blue shifted, such that there is a blue shift in the radiation frequencies absorbed by the nanocrystal.

Figure 4B:
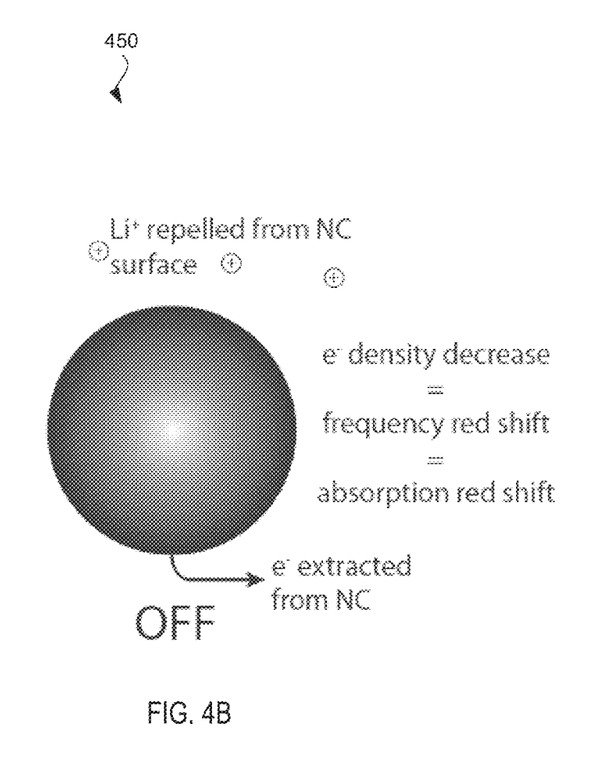
FIG. 4B is a schematic of nanocrystal electron density in an uncharged state, in accordance with an embodiment of the present invention.

FIG. 4B is a schematic of nanocrystal electron density in an uncharged (off) state, in accordance with an embodiment of the present invention. As shown, electrons are extracted from a nanocrystal to place it into an uncharged (off) state, which causes lithium ions to be repelled from a surface of the nanocrystal. A decrease in electron density of the nanocrystal causes the nanocrystal surface plasmon resonance frequency to be red shifted, such that there is a red shift in the radiation frequencies absorbed by the nanocrystal.

Figure 5:
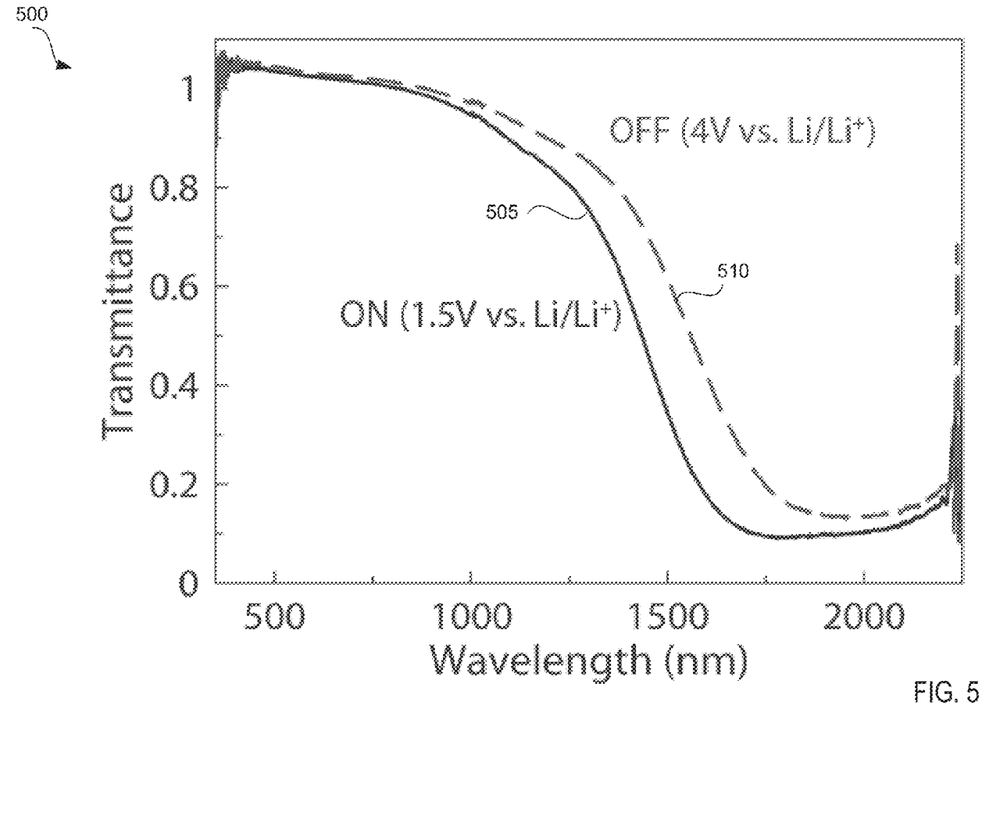
FIG. 5 is a plot of transmission vs. wavelength for one implementation of an un-optimized nanocomposite electrochromic device in both an off state and an on state.

FIG. 5 is a plot 500 of transmission vs. wavelength for one implementation of an un-optimized nanocomposite electrochromic device in both an off state 510 and an on state 505. In the NIR portion of the electromagnetic spectrum (e.g., at wavelengths of approximately 1300-1800 nm), a modulation of approximately 6% is shown between the on state 505 and off state 510. Additionally, a modulation of approximately 3% is shown over the full electromagnetic spectrum, and a 1% modulation is shown over the visible portion of the electromagnetic spectrum.

Plot 500 shows spectro-electrochemical characterization of an electrochromic nanocomposite film composed of a PEO polymer matrix with ITO nanocrystals and a lithium salt dispersed in the PEO polymer matrix. The characterization was carried out in a three-electrode cell, with lithium foil as the counter and reference electrodes. At 4V vs. Li/Li+, free electrons are extracted from the ITO nanocrystals and lithium ions move away from the nanocrystal surfaces, causing the device to be in the bleached state. At 1.5 V vs. Li/Li+, electrons are injected into the ITO nanocrystals as lithium ions are attracted to the nanocrystal surfaces, causing the device to be in the colored state. The modulation in transmittance indicates that the ITO nanocrystals form an electron conducting network, and that the PEO forms an ion conducting matrix.

The physical phenomenon that causes the transmittance modulation of the TCO nanocrystals is localized surface Plasmon resonance (LSPR). LSPR is a collective charge oscillation of valence electrons in a nanocrystal stimulated by incident radiation (e.g., light). A resonance condition is established when the frequency of photons matches a natural frequency of surface electrons oscillating against a restoring force of positive nuclei. The local surface Plasmon resonance of the TCO nanocrystal (e.g., of ITO NCs) can be dynamically tuned through a reversible electrochemical doping achieved by charging the TCO nanocrystals (e.g., by applying a negative bias). The LSPR modulation may be a collective response to added free electrons introduced by the migration of lithium ions to a surface of the TCO NCs. This shifts the LSPR peak across a range covering much of the NIR spectrum. Thus, for TCO NCs such as small highly doped NCs (e.g., ITO NCs), the Plasmon frequency and associated free carrier concentration can be strongly modulated throughout the volume of each NC, and of an overall electrochromic nanocomposite film.

Figure 6:
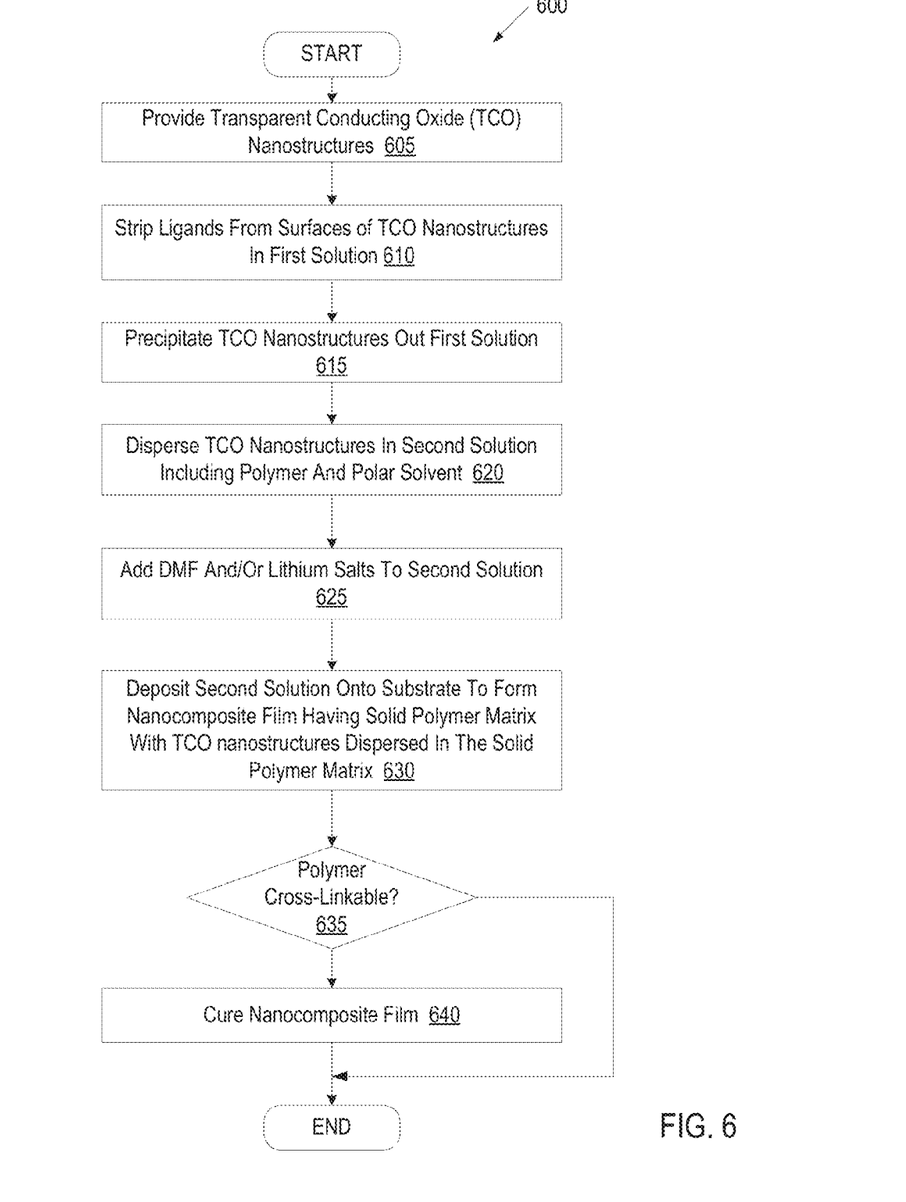
FIG. 6 is a flow chart illustrating a method of manufacturing an electrochromic device, in accordance with one implementation of the present invention.

FIG. 6 is a flow chart illustrating a method 600 of manufacturing an electrochromic device, in accordance with one implementation of the present invention. Method 600 may be performed using solution processing techniques at room temperature. The manufactured electrochromic device may correspond to the electrochromic device illustrated in FIGS. 2A-3B. FIGS. 7A-7D illustrate TCO nanocrystals during various stages of the method 600, in accordance with one embodiment of the present invention.

Referring now to FIG. 6, at block 605 of method 600 transparent conducting oxide (TCO) nanocrystals are provided. The TCO nanocrystals may have high crystallinity, homogenous composition with narrow size distributions. The TCO nanocrystals may be ITO nanocrystals (NCs), AZO nanocrystals, or any of the other previously mentioned nanocrystals.

The TCO nanocrystals may be synthesized by performing coprecipitation of metal precursors followed by thermal treatment, by laser induced fragmentation, by solvo-thermal synthesis, by microwave-assisted synthesis, by emulsion techniques, and so on. TCO nanocrystals, including ITO and AZO nanocrystals, may also be synthesized using standard Schlenk line processes. Exemplary of such processes, indium acetyl acetonate [$In(acac)_3$], or $In(ac)_3$ can be mixed with one of bis(acetylacetonato)dichoro tin [$Sn(acac)_2Cl_2$], $Sn(ac)_2$, or $Sn(ac)_4$. The mixture may be heated to about 250° C. in the presence of a surfactant such as oleyamine or oleic acid to form functionalized and stabilized nanocrystal surfaces.

In one embodiment, the TCO nanocrystals are ITO nanocrystals (NCs). The ITO NCs may be colloidal, monodisperse, and highly crystalline having a size on the order of 3-10 nm in diameter (with an average size of about 5 nm) and a tin oxide content of approximately 1-20 atom %. In one embodiment the ITO NCs are synthesized by the following process. Primary amines are injected into a hot solvent solution of indium and tin carboxylates with free carboxylic acid. In particular, an octadecene (ODE) solvent solution of indium and tin acetates (e.g., $In(Ac)_3$ and $Sn(Ac)_2$) with myristic acide (MA) is degassed at around 110° C. for about two hours. In one embodiment, a 9:1 ratio of Indium-to-Tin is used. The solution is heated to about 250° C. to yield $In(Ac)_{3-x}(Mt)$, and $Sn(Ac)_{2-x}(Mt)_x$ carboxylate precursors. Other amines such as oleylamine or dodecylamine may also be used instead of ODA.

In another embodiment, ITO NCs are synthesized by the following process. A white slurry of Indium and Tin precursors (e.g., $In(acetylacetonate)_3$ and $Sn(acetylacetonate)_2Cl_2$) in variable ratios is added to an oleylamine solution and heated at 250° C. for about five yours under argon atmosphere. Ethanol is then added to the solution to induce precipitation. Centrifugation and washing with ethanol or another solvent is then performed to provide pure ITO NCs. In one embodiment, a 1:12 molar ratio of metal precursors (5/95 Sn:In ratio) to oleylamine is used. This may produce spherical ITO nanoparticles with an average diameter of about 7 nm with 5 atom % of Sn. Smaller nanoparticles of 3 nm and 5 nm may be obtained by using 1:192 and 1:48 molar ratios, respectively, of both metal precursors-to-oleylamine.

Figure 7A:
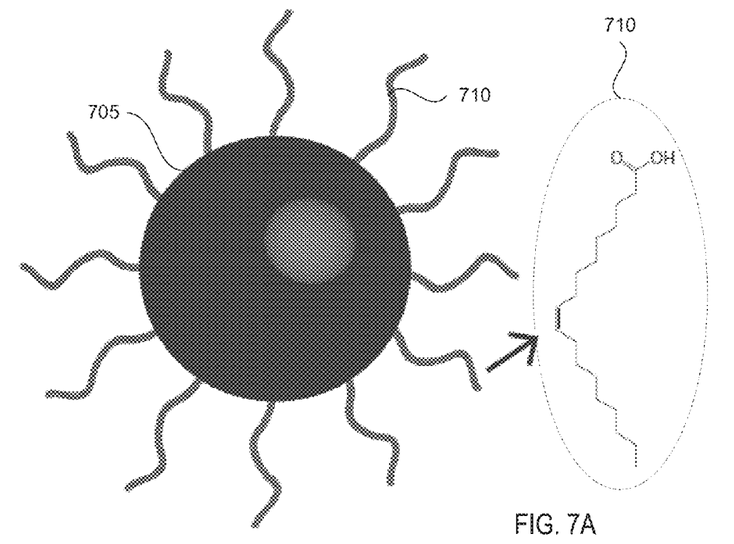
FIG. 7A illustrates a formed nanocrystal, in accordance with one implementation of the present invention.

As shown in FIG. 7A, surfaces of the provided TCO nanocrystals 705 are covered by long organic ligands 710. These organic ligands 710 (e.g., such as oleic acid ligands) can be used to functionalize and stabilize nanocrystal surfaces, and allow for dispersion in non-polar solvents. However, these ligands create an insulating barrier around each nanocrystal, and block the access of molecular species to a surface of the nanocrystals.

Referring back to FIG. 6, at block 610 of method 600 ligands are stripped from surfaces of the TCO nanostructures in a first solution. More particularly, to enable electronic transport between nanocrystals, the organic ligands on the nanocrystal surfaces are removed by a ligand exchange process. This process renders the nanocrystal surfaces bare and hydrophilic, allowing them to interact with each other and with various polymers and solvents. Accordingly, this process enables the TCO nanocrystals to be dispersed in a polar solvent.

The TCO nanocrystals may initially be suspended in a non-polar solvent such as hexane, heptane, toluene, benzene or octane. The non-polar solvent may functionalize and stabilize the TCO nanocrystals. The functionalized and stabilized nanocrystals suspended in the non-polar solvent may be admixed with fluoroborate salts such as nitrosonium tetrafluoroborate ($NOBF_4$), diazonium tetrafluoroborate or triethyloxonium tetrafluoroborate. This enables $[BF_4]^-$ anions to replace ligands on the surface of the TCO nanocrystals. The fluoroborate salts may be dispersed in a polar organic solvent such as N,N-dimethyl formamide (DMF). In such an embodiment, DMF molecules may also replace some of the stripped ligands on the surfaces of TCO NCs.

In one embodiment, the following ligand exchange procedure is performed. A dispersion of the TCO NCs in hexane (NC hexane dispersion) is combined with a dichloromethane solution of $NOBF_4$ at room temperature. The resulting mixture may be shaken until precipitation of the TCO NCs occurs. Centrifugation may be performed to separate the TCO NCs from the solution, and the TCO NCs may be redispersed in a hydrophilic media such as DMF, dimethylsulfoxide (DMSO) or acetonitrile. To purify the NCs, toluene and hexane (at a 1:1 ratio) may be added to flocculate the NC dispersion.

In an alternative embodiment, the ligand exchange process is carried out based on a phase transfer process. In this procedure, the NC hexane dispersion is combined with acetonitrile to form a two-phase mixture. $NOBF_4$ is then added to the mixture, and the mixture may be stirred. This causes the original surface ligands to be replaced by the $[BF_4]^-$ anions. The surface-modified TCO NCs may then be purified by precipitation with the addition of toluene, and the precipitated TCO NCs may be redispersed into various hydrophilic media.

In another embodiment, the ligand exchange process is carried out by adding the NC hexane dispersion to DMF to form a two-phase mixture. $NOBF_4$ or 4-nitrobenzenediazonium tetrafluoroborate compounds such as 4-bromobenzenediazonium tetrafluoroborate or 4-bromobenzenediazonium tetrafluoroborate are added to the solution. This causes the TCO NCs to be transferred from an upper hexane layer to a lower DMF layer. TCO NCs may then be purified as described above. The hydrophilic NCs obtained by $NOBF_4$ or diazonium tetrafluoroborate treatments can be further functionalized by various capping molecules such as oleic acid (OA), oleylamine (OAm), Tetradecylphosphonic acid (TDPA) or hexylamine (Ham) through a secondary ligand exchange reaction. This may enable fully reversible phase transfer of NCs between hydrophobic and hydrophilic media.

In another embodiment, TCO nanocrystals are added to trimethyloxonium tetrafluoroborate ($Me_3OBF_4$) or trialkyl oxonium salts dissolved in MeCN to form a biphasic solution. The solution strips the ligands from the TCO nanocrystals. Chloroform may be added to the solution, and the solution is centrifuged to separate out precipitated TCO nanocrystals. The TCO nanocrystals are then washed with additional chloroform to remove excess $Me_3OBF_4$ (or trialkyl oxonium) and methyl oleate, before redispersing in DMF. Note that if trialkyl oxonium salts are used to perform the ligand exchange, then the original ligands are replaced by $[PF_6]^-$ anions.

Figure 7B:
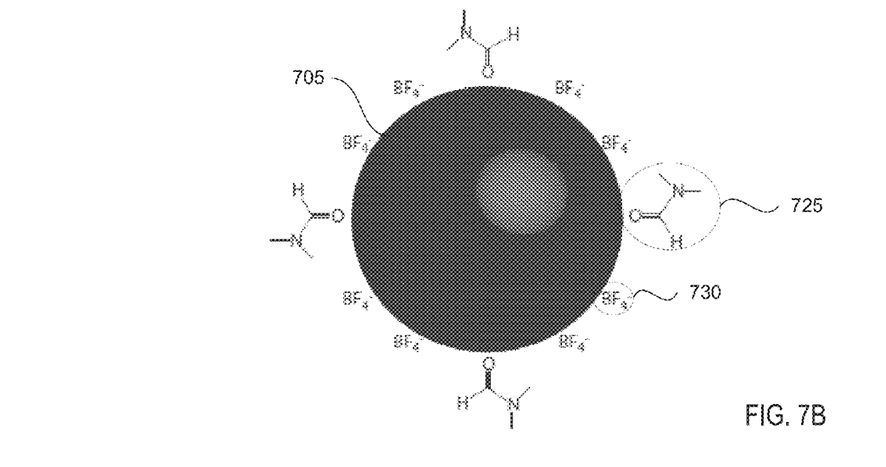
FIG. 7B illustrates a formed nanocrystal after ligands have been stripped from a surface of the nanocrystal, in accordance with one implementation of the present invention.

FIG. 7B illustrates the TCO nanocrystals 705 after the original organic ligands have been stripped from the TCO nanocrystal's 705 surface and replaced by shorter molecules. In the illustrated embodiment, a solution of $NOBF_4$ and DMF was used to perform the ligand stripping, and the original ligands have been replaced by $[BF_4]^-$ anions 730 and DMF molecules 725.

Referring back to FIG. 6, at block 615, the TCO nanocrystals are precipitated out of the first solution. The precipitation may be achieved by separating the TCO nanocrystals from the solution using a centrifuge and washing the TCO nanocrystals with a clean solvent as previously described. This process may be repeated one or more times to produce a pure dispersion of TCO nanocrystals.

At block 620, the TCO nanocrystals are dispersed in a second solution including a lithium ion-conducting polymer and a polar solvent (e.g., an organic solvent). To be noted is that the TCO nanocrystals may be technically considered to form a colloidal suspension or dispersion. From time to time, herein, the suspension/dispersion will also be referred to as a solution, and these terms are used interchangeably throughout this application.

The polar solvent of the solution into which the TCO nanocrystals are added may be acetonitrile, water, ethanol, and so on. The lithium ion-conducting polymer may be a solid polymer electrolyte (or a precursor to a solid polymer electrolyte) capable of having an ionic conducting phase formed by dissolved salts in a polar polymer matrix. Examples of lithium ion-conducting polymers include Poly(ethylene oxide) (PEO), Polymethylmethacrylate (PMMA), poly(vinyl butyral) (PVB), Poly(vinyl fluoride) (PVDF), Poly(vinyl chloride) (PVC), Polyacrylonitrile (PAN), Poly(dimethylsiloxane) (PDMS), Poly(propylene oxide) (PPO), Poly[is (methaxyethaxyethax-ide)-phosphazene](PMEP), and Poly (vinylidene fluoridehexafluoropropylene) (PVDF-HFP). Other examples of usable polymers include a block copolymer PEO-block-poly (N, N-dimethylacrylamide) (PEO-b-PDMA), and a cross-linkable polymer such as Poly(ethylene glycol) dimethacrylate.

Figure 7C:
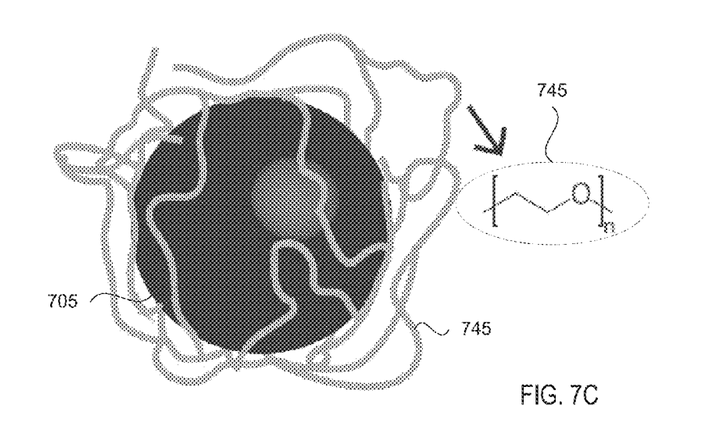
FIG. 7C illustrates a nanocrystal in a polymer matrix, in accordance with one implementation of the present invention.

Addition of the TCO nanocrystals (e.g., ITO NCs) to the solution of the polar solvent and polymer forms a stable TCO nanocrystal/polymer solution. In one embodiment, the polar solvent is acetonitrile, the polymer is PEO, and the TCO nanocrystals are ITO nanocrystals. FIG. 7C illustrates the TCO nanocrystal 705 suspended in a polymer 745 such as PEO.

Referring back to FIG. 6, at block 625, DMF and/or a lithium salt may be added to the solution. The lithium salt may be lithium bis (trifluoromethylsulfonyl)imide (LiTFSI), lithium bis(perfluoroethylsulfonyl)imide (LiBETI), lithium perchlorate ($LiClO_4$), lithium tetrafluoroborate ($LiBF_4$), lithium hexafluorophosphate ($LiPF_6$), lithium methanesulfonate ($LiCF_3SO_3$), or lithium bis (oxalate) borate (LiB $(C_2O_4)_2$). The lithium salt may be part of another solution containing a lithium ion-conducting polymer and the organic solvent to form a stable salt/polymer solution. In this case, the lithium salt is pre-dissolved in the polymer, and the solvent, if desired, can be evaporated to encourage dissolution of the lithium salt in the polymer. These two components (the polymer-nanocrystal dispersion and the polymer containing dissolved lithium salt) can then be mixed to form a homogeneous solution prior to deposition on a substrate. In one embodiment, the lithium salt and polymer containing solution is added to the second solution (after evaporating the solvent) shortly before depositing the solution onto a substrate. For example, the lithium salt may be mixed into the solution 30 minutes or less before the solution is deposited. This is because the polymer is attracted to lithium ions, which can cause the polymer to detach from the nanocrystals to interact with the lithium ions. This leaves exposed regions of the nanocrystals' surfaces, when causes them to agglomerate over time. Such agglomeration may cause a resultant film to be opaque or cloudy.

Figure 8:
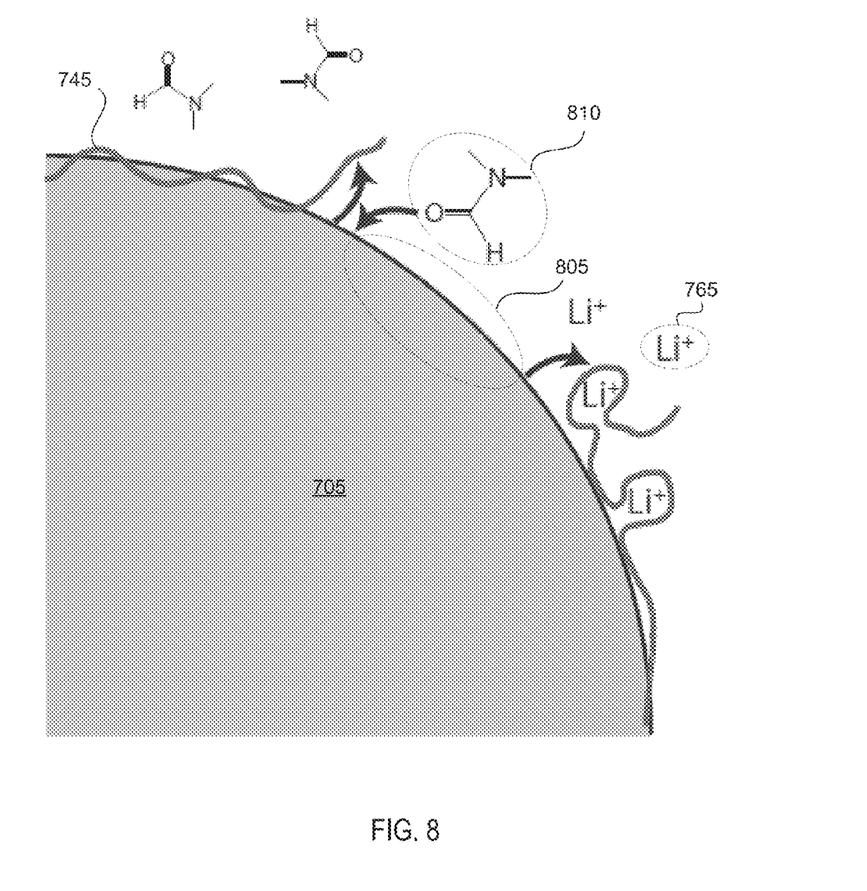
FIG. 8 is an exploded view of a section of an ITO nanocrystal illustrating the effects of using DMF as a solvent, in accordance with an implementation of the present invention.

Addition of DMF to the second solution may increase a level of agglomeration between TCO nanocrystals as the solution is deposited on a substrate. The DMF may attach to some regions of the surfaces of the TCO nanocrystals in place of the polymer attaching to those regions. This phenomenon is illustrated in FIG. 8, which is an exploded view of a section of a TCO nanocrystal 705. As shown, a DMF molecule 810 attaches to a region 805 of the TCO nanocrystal 705, displaying the polymer 745.

As the solution is deposited, the DMF evaporates, exposing those regions to which the DMF was attached. These regions may then attach to exposed regions of other nanocrystals. Some level of agglomeration is beneficial, as it can increase electrical conductivity of a resultant film. However, too much agglomeration can cause adverse optical effects. In one embodiment, an amount of DMF is added to the solution so that the solution contains up to 5% DMF. Additional amounts of DMF above 5% may cause the adverse optical effects (e.g., causing cloudiness in the resultant film).

Referring back to FIG. 6, at block 630 the solution is deposited onto a substrate to form a nanocomposite film having a solid polymer matrix with TCO nanocrystals dispersed in the solid polymer matrix. The polymer matrix may also include lithium salt disposed therein. The substrate onto which the solution is deposited may be glass, quartz, silicon, plastic, ITO, or fluorine-doped tin oxide slides, for example. Any type of solution based deposition process may be used to perform the deposition, such as spin coating, drop casting, spray coating, or doctor blade techniques. In a specific embodiment, a nanocomposite film is deposited directly from solution by spin-coating.

Figure 7D:
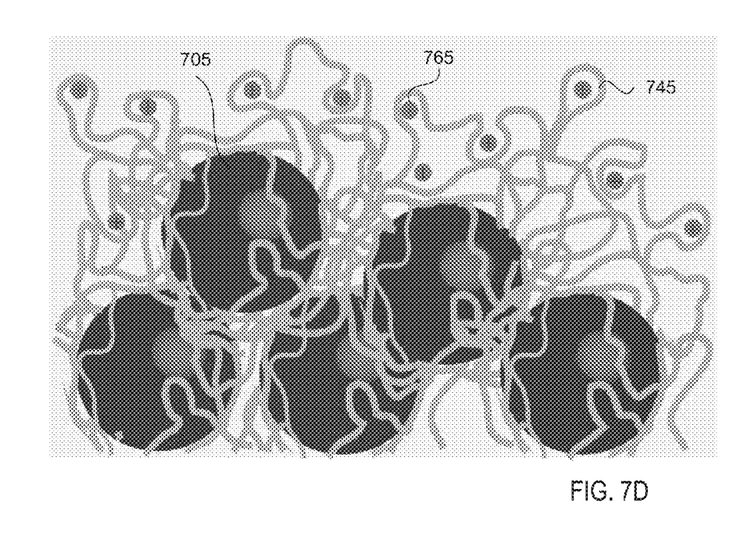
FIG. 7D illustrates a cluster of nanocrystals and lithium ions in a polymer matrix, in accordance with one implementation of the present invention.

FIG. 7D illustrates a thin film including a cluster of nanocrystals 705 and lithium ions 765 in a polymer matrix 745, in accordance with one implementation of the present invention. Nanocrystal-polymer weight ratio, presence of lithium salt, and polymer chemistry all influence morphology and microphase separation (e.g., amount of agglomeration). Nanocrystals may self-assemble into percolating networks upon deposition when a polymer such as PEO is used. This indicates that PEO is relatively weakly bound to the NC surfaces and that adjacent NCs can aggregate somewhat easily.

Self-assembly can be utilized to influence electrical properties, as interparticle contact and distances affect electron transport. Decreasing TCO nanocrystal concentration appears to yield better NC surface passivation and less phase separation. Lithium ions have a strong effect on phase separation. Lithium ions may strip the polymer away from the NC surfaces to form coordination complexes, exposing more adjacent surfaces and causing greater aggregation.

The use of DMF moderates microphase separation. DMF strongly interacts with the bare nanocrystal surfaces, and appears to compete with the polymer as a passivating agent. This is particularly apparent in the presence of lithium ions. As solvent leaves the film during spin coating or other deposition techniques, nanocrystal surfaces are exposed, inducing microphase separation of the nanocrystals.

In addition to DMF being used to control the level of agglomeration between TCO nanocrystals, specific polymers may be chosen that affect the level of agglomeration (also referred to as phase separation). For example, polymers that interact more strongly with NC surfaces can mitigate phase separation. In one embodiment, block copolymers are used to decrease agglomeration (increase phase separation). A block copolymer is a polymer with two distinct ends. One end of the block copolymer may be a lithium ion-conducting polymer such as PEO. The other end of the block copolymer may be a polymer that is attracted to the surface of the TCO nanocrystals, such as poly (N,N-dimethylacrylamide) (PDMA), which mimics the chemical structure of DMF. Such a block copolymer may be PEO-block-poly(N,N-dimethylacrylamide) (PEO-b-PDMA). The PDMA end of the block copolymer may attach to the surface of the nanocrystals and prevent them from clumping and keep them well dispersed in the polymer matrix. This is because the PDMA block of the block copolymer PEO-b-PDMA mimics DMF, interacting favorably with the NC surface. Accordingly, use of the block copolymer and/or DMF may be used to control the self assembly of nanocrystals in the polymer matrix at deposition.

As mentioned, in one embodiment a photo-cross-linkable polymer is used for the polymer. Referring back to FIG. 6, at block 635 of method 600 if a cross-linkable polymer was used, the method continues to block 640 and the deposited nanocomposite film is cured. The nanocomposite film may be cured by ultraviolet (UV) exposure to crosslink the polymer. This could be used to make the nanocomposite stronger and more resistant to solvents.

Method 600 shows a method of forming electrochromic nanocomposite film 215 of FIGS. 2A-2B. Other layers shown in FIGS. 2A-2B (e.g., transparent conducting layers 210, 230, electrolyte 220 and additional nanocomposite layer 225) may also be formed using modified solution processing techniques. For example, the transparent conducting layer 210 may first be deposited in solution form onto a glass substrate. The transparent conducting layer 210 may then be treated using a UV ozone treatment, in which the transparent conductive layer 210 is exposed to UV radiation. This generates ozone molecules from ambient oxygen. The ozone molecules react with the surface of the transparent conductive layer, which has a cleaning effect and causes the transparent conducting layer 210 to become a polar surface. As a result, nanocrystals and the polymer will adhere more strongly to the surface of the transparent conductive layer.

After the electrochromic nanocrystal film (e.g., the solution of nanocrystals/polymer/lithium) is deposited and dried, an electrolyte layer may be deposited, followed by an additional nanocomposite film and an additional transparent conductive layer. The process for preparing the additional nanocomposite film may be much the same as that used for preparing the electrochromic nanocomposite film. The same type of materials may be used as well, with different TCO nanocrystals. Accordingly, method 600 may be performed to form the additional nanocomposite film.

In one embodiment, the additional transparent conductive layer may be formed on an additional substrate, and the additional nanocomposite film may be formed over the additional transparent conductive layer. Next, an electrolyte film, preferably made from the same lithium ion containing polymer as the electrochromic nanocomposite layer, is sandwiched between the two substrates. The sandwiched substrates may be compressed and laminated under heat to complete the assembly. Thus, the resulting electrochromic device would have the following order of layers: first substrate, first transparent conductive layer, electrochromic nanocomposite layer, electrolyte layer, additional nanocomposite layer, second transparent conductive layer, and second substrate.

One advantage of above described embodiments is that they allow one to fabricate an entire electrochromic device by solution processing. Compared to other fabrication methods, such as sputtering, solution processing is a simple, efficient, and cost-effective manufacturing technique. Materials and methods provided herein also present low toxicities and are environmentally friendly. In addition to these advantages, a nanocrystal-polymer nanocomposite electrochromic device as described herein has the potential advantages of higher coloration efficiency and rapid switching compared to current electrochromic devices. This is due to the nanoscale structuring of the TCO nanocrystals, which results in high porosity and a high surface area. In the nanocomposite, the polymer electrolyte interpenetrates a nanocrystal network, allowing for intimate contact between the nanocrystals and the polymer, which in turn allows for fast diffusion of lithium ions to the nanocrystal surfaces to initiate the electrochromic effect. Finally, a nanocrystal-polymer nanocomposite electrochromic device has the advantage of being a fully solid-state device. There are no volatile solvents used, and the polymer matrix offers the potential advantage of device flexibility. These aspects should improve the durability, lifetime, and environmental impact of electrochromic devices.

The above examples are provided to illustrate embodiments of the present invention but not to limit its scope. Other variants of the invention will be readily apparent to one of ordinary skill in the art. The scope of the invention should, therefore, be determined with reference to the appended claims, along with the full scope of equivalents to which such claims are entitled.

What is claimed is:

1. An electrochromic device comprising:
a transparent substrate;
an electrode on the transparent substrate, the electrode comprising a first transparent conducting layer and an the electrochromic nanocomposite film comprising:
a solid polymer matrix;
a plurality of transparent conducting oxide (TCO) nanostructures dispersed in the solid polymer matrix; and
a lithium salt dispersed in the solid polymer matrix;
a counter electrode, comprising a second transparent conducting layer and an additional nanocomposite layer, wherein the additional nanocomposite layer comprises:
a second polymer solid matrix;
a second plurality of TCO nanostructures dispersed within the second polymer solid matrix; and
the lithium salt dispersed within the second polymer solid matrix; and
a solid electrolyte layer separating the electrode from the counter electrode.

2. The electrochromic device film of claim 1, wherein the plurality of TCO nanostructures comprise at least one of tin-doped indium oxide (ITO), aluminum doped zinc oxide (AZO), indium-doped zinc oxide (IZO), gallium-doped zinc oxide (GZO), zinc, tin-doped indium oxide (ZITO), fluorine-doped tin oxide (FTO), or indium doped cadmium oxide (CdO:In).

3. The electrochromic device of claim 1, wherein the solid polymer matrix comprises a lithium ion-conducting solid polymer.

4. The electrochromic device of claim 3, wherein the lithium ion-conducting solid polymer comprises at least one of Poly(ethylene oxide) (PEO), Polymethylmethacrylate (PMMA), poly(vinyl butyral) (PVB), cross-linked Poly(ethylene glycol) or a block copolymer PEO-block-poly (N, N-dimethylacrylamide) (PEO-b-PDMA).

5. The electrochromic device of claim 3, wherein a weight ratio of the TCO nanostructures to the lithium ion-conducting solid polymer is approximately 1:10 to approximately 2:1.

6. The electrochromic device of claim 1, wherein the solid polymer matrix comprises a block copolymer comprising a first polymer that conducts lithium and a second polymer that interacts with surfaces of the plurality of TCO nanostructures.

7. The electrochromic device of claim 1, wherein the electrochromic nanocomposite film has a thickness of approximately 50-5000 nanometers, is selective in a near infrared (NIR) portion of an electromagnetic spectrum, and is transparent in a visible portion of the electromagnetic spectrum.

8. The electrochromic device of claim 1, wherein:
the second plurality of TCO nanostructures comprise at least one of cerium oxide, undoped indium oxide, undoped zinc oxide, or $Fe_7(CN)_{18}$;
the second polymer is a lithium ion-conducting solid polymer comprising at least one of Poly(ethylene oxide) (PEO), Polymethylmethacrylate (PMMA), or poly(vinyl butyral) (PVB); and
the solid electrolyte layer is a lithium ion-conducting solid polymer comprising at least one of PEO, PMMA, or PVB.

9. A method comprising:
providing a plurality of transparent conducting oxide (TCO) nanostructures;
stripping ligands from surfaces of the plurality of TCO nanostructures in a first solution;
dispersing the TCO nanostructures in a second solution comprising a polymer and polar solvent; and
depositing the second solution onto a substrate to form a nanocomposite film having a solid polymer matrix with the TCO nanostructures dispersed in the solid polymer matrix, wherein:
the polar solvent comprises one of acetonitrile, water, or ethanol;
the TCO nanostructures comprise at least one of tin doped indium oxide (ITO), aluminum doped zinc oxide (AZO), indium-doped zinc oxide (IZO), gallium-doped zinc oxide (GZO), zinc, tin-doped indium oxide (ZITO), fluorine-doped tin oxide (FTO), or indium doped cadmium oxide (CdO:In);
the polymer is a lithium ion-conducting polymer comprising at least one of Poly(ethylene oxide) (PEO), Polymethylmethacrylate (PMMA), poly(vinyl butyral) (PVB), or a block copolymer PEO-block-poly (N, N-dimethylacrylamide) (PEO-b-PDMA); and
the second solution further comprises a lithium salt.

10. The method of claim 9, wherein the first solution comprises a solvent and at least one of nitrosonium tetrafluoroborate ($NOBF_4$) or triethyloxonium tetrafluoroborate dissolved in the solvent, and wherein at least a portion of the stripped ligands are replaced by $[BF_4]^-$ anions, and wherein the first solution further comprises N, N-dimethyl formamide (DMF), and wherein at least a portion of the stripped ligands are replaced DMF molecules.

11. The method of claim 9, wherein depositing the second solution onto the substrate comprises performing one of a spin casting, drop casting, spray coating, dip coating, slot die coating, or doctor blade technique.

12. The method of claim 9, wherein the polymer comprises Poly(ethylene glycol) dimethacrylate, the method further comprising:
curing the nanocomposite film using ultraviolet radiation to form cross linked Poly(ethylene glycol).

13. A method comprising:
providing a solution comprising a polymer, transparent conducting oxide (TCO) nanostructures, and a lithium salt; and
providing the solution onto a substrate to form an electrochromic nanocomposite film comprising a solid polymer matrix with the TCO nanostructures and the lithium salt dispersed in the solid polymer matrix, wherein:
the TCO nanostructures comprise at least one of tin doped indium oxide (ITO), aluminum doped zinc oxide (AZO), indium-doped zinc oxide (IZO), gallium-doped zinc oxide (GZO), zinc, tin-doped indium oxide (ZITO), fluorine-doped tin oxide (FTO), or indium doped cadmium oxide (CdO:In);
the polymer is a lithium ion-conducting polymer comprising at least one of Poly(ethylene oxide) (PEO), Polymethylmethacrylate (PMMA), poly(vinyl butyral) (PVB), or a block copolymer PEO-block-poly (N, N-dimethylacrylamide) (PEO-b-PDMA); and the lithium salt comprises lithium bis (trifluoromethylsulfonyl)imide (LiTFSI), lithium bis(perfluoroethylsulfonyl)imide (LiBETI), lithium perchlorate (LiClO$_4$), lithium tetrafluoroborate (LiBF$_4$), lithium hexafluorophosphate (LiPF$_6$), lithium methanesulfonate (LiCF$_3$SO$_3$), or lithium bis (oxalate) borate (LiB(C$_2$O4)$_2$).

14. The method of claim 13, wherein the solution comprises a colloidal suspension or dispersion.

15. The method of claim 13, wherein the substrate comprises a transparent substrate containing a first transparent conducting layer between the electrochromic nanocomposite film and the transparent substrate.

16. The method of claim 15, further comprising forming a counter electrode comprising a second transparent conducting layer and an additional nanocomposite layer over the solid polymer matrix, wherein the solid polymer matrix comprises an electrolyte of an electrochromic device.

17. The method of claim 15, further comprising:
  forming a solid polymer electrolyte and a lithium salt over the electrochromic nanocomposite film; and
  forming a counter electrode comprising a second transparent conducting layer and an additional nanocomposite layer over the solid polymer electrolyte to form an electrochromic device.

* * * * *